June 23, 1925.  G. VINÇON  1,543,135
BALL BEARING
Filed May 31, 1922
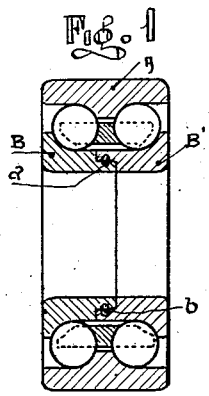
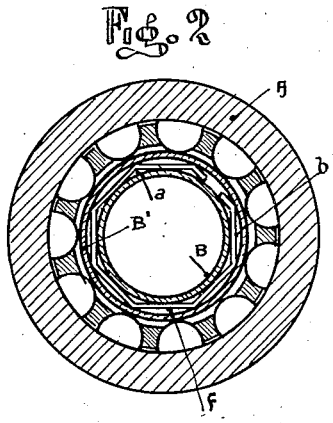
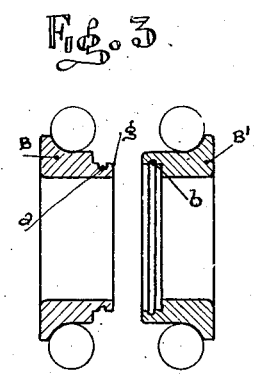
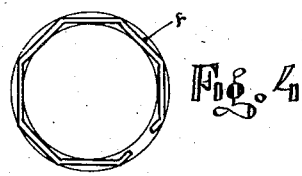
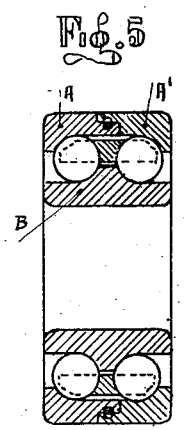
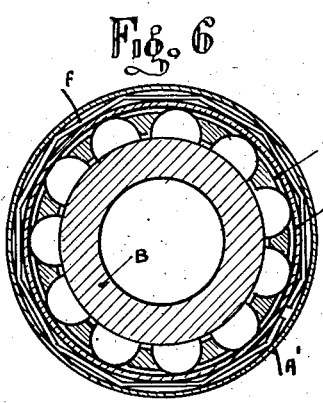
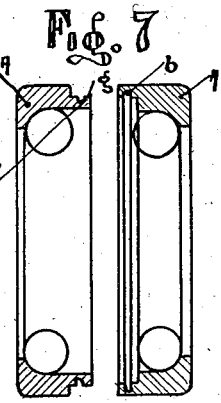
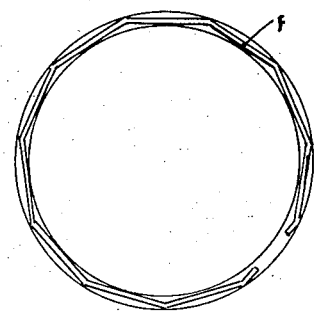
Inventor.
Gustavo Vinçon,
By Henry Ortiz
Atty

Patented June 23, 1925.

1,543,135

UNITED STATES PATENT OFFICE.

GUSTAVO VINÇON, OF VILLAR PEROSA, NEAR PINEROLO, ITALY.

BALL BEARING.

Application filed May 31, 1922. Serial No. 564,899.

*To all whom it may concern:*

Be it known that I, GUSTAVO VINÇON, a subject of the King of Italy, residing at Villar Perosa, near Pinerolo, in the Kingdom of Italy, have invented certain new and useful Improvements in Ball Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The radial and thrust bearings having a double series of balls and no openings for placing the balls in the raceway often have their inner or outer race made of two pieces connected together by means of a bushing, the edges whereof are enlarged at both ends, so that the bearings cannot become disconnected.

In accordance with this invention, I make the inner or outer race of two pieces the adjacent ends whereof are fitted into each other, and I provide a groove on each overlapping surface, said grooves forming when the bearing is assembled a single annular chamber, wherein engages a split ring of steel wire of polygonal or other shape, the successive edges whereof engage in the grooves on each portion of the race, alternatively, thus connecting both pieces in a reliable and permanent manner.

The accompanying drawing shows by way of example two constructional forms of the radial and thrust bearing in accordance with my invention, having the inner and outer race made of two pieces, respectively.

Figs. 1 and 2 are an axial section and a longitudinal section respectively of an assembled bearing having its inner race composed of two parts.

Fig. 3 shows the parts of the inner race in their disconnected position.

Fig. 4 is an elevation of the polygonal split ring.

Figs. 5 and 6 are an axial section and a longitudinal section, respectively, of an assembled bearing having its outer race made of two parts.

Fig. 7 shows the component parts of the outer race in their disconnected position.

Fig. 8 shows the polygonal split ring.

Referring to Figs. 1 to 4 of the first constructional form:

A denotes the outer race and B, B' the component parts of the inner race, the adjacent ends whereof are fitted into each other as clearly indicated in the drawing (Fig. 1).

In these thinner portions of the pieces B and B' is provided an outer groove $a$ and an inner groove $b$, respectively, which correspond when the bearing is assembled building a single chamber wherein the split ring $f$ made of steel wire and having a polygonal or other similar shape engages on the assembling of the bearing, the edges thereof engaging in the groove $a$, and the vertex engaging in the groove $b$.

It is clear that when the bearing is assembled the component parts of the inner race are tightly connected together and can not be separated unless the steel wire is cut. In order to place the ring $f$ between the grooves $a$ and $b$, a conical surface $g$ is provided on the race portion B on the side of the groove $a$.

Referring to Figs. 5 to 8 illustrating a modified constructional form of my invention:

B denotes the inner race, A and A' denote the two component parts of the outer race (similar to the pieces B, B' of the first constructional form) provided with grooves $a$ and $b$ respectively. $f$ denotes the polygonal split ring of steel wire engaging, as described above, in the annular chamber formed by the grooves $a$ and $b$.

What I claim is:

1. A race-way for ball bearings comprising two annular members adapted to contain a series of balls, each member having one edge reduced in thickness to form a telescoping connection between the members, annular grooves formed in the opposing faces of said reduced edges and adapted when the edges are assembled to form an annular chamber substantially cylindrical in cross section, and a polygonal split member adapted to be inserted between the grooves to lock the edges together.

2. A race way for double ball bearings, comprising two annular members adapted to contain a double series of balls, said members having adjacent telescoping edges reduced in thickness, an annular groove formed in the outer periphery of the reduced edge of one member, an annular groove formed in the inner periphery of the reduced edge of the other member, the assembled grooves forming an annular chamber substantially cylindrical in cross section, and a split connecting member substantially polygonal in form mounted between the assembled grooves and adapted to engage the walls of the latter to prevent the separation of the annular members.

3. A race way for double ball bearings, comprising two annular members adapted to contain a double series of balls, said members having adjacent telescoping edges reduced in thickness, an annular groove formed in the outer periphery of the reduced edge of one member, an annular groove formed in the inner periphery of the reduced edge of the other member, the assembled grooves forming an annular chamber substantially cylindrical in cross section, a split connecting member substantially polygonal in form mounted between the assembled grooves and adapted to engage the walls of the latter to prevent the separation of the annular members, the reduced edge of one member having a beveled portion to facilitate the insertion of said connecting member.

4. A race way for double ball bearings comrising two annular members adapted to contain a double series of balls, each member having one edge reduced in thickness to form a telescoping connection between the members, annular grooves formed in said reduced edges and adapted when the edges are assembled to form an annular chamber substantially cylindrical in cross section, a polygonal split member adapted to be inserted between the grooves to lock the edges together, and a solid annular member arranged concentrically to the two annular members and having two race ways to receive the series of balls.

In testimony that I claim the foregoing as my invention, I have signed my name.

GUSTAVO VINÇON.